May 13, 1941.  H. W. BUBOLTZ  2,241,537
CARBURETOR VALVE
Filed April 22, 1939

Inventor.
Herman Buboltz.
by Orwig & Hague Attys.

Patented May 13, 1941

2,241,537

UNITED STATES PATENT OFFICE 2,241,537

CARBURETOR VALVE

Herman W. Buboltz, Lewis, Iowa

Application April 22, 1939, Serial No. 269,504

1 Claim. (Cl. 251—84)

Carburetor valves for automobiles are manually controlled by a throttle lever and are also automatically controlled by a governor mechanism. This makes it desirable that the valve operate with a minimum of friction.

The object of my invention is to provide a carburetor valve of simple, durable and inexpensive construction which, under all the conditions of actual use will operate with a minimum of friction and which will effect a more thorough mixture of air and vapor than is possible with the carburetor valves now in general use.

Referring to the accompanying drawing Figure 1 shows a top or plan view of my improved carburetor;

Figures 1, 2, 3:
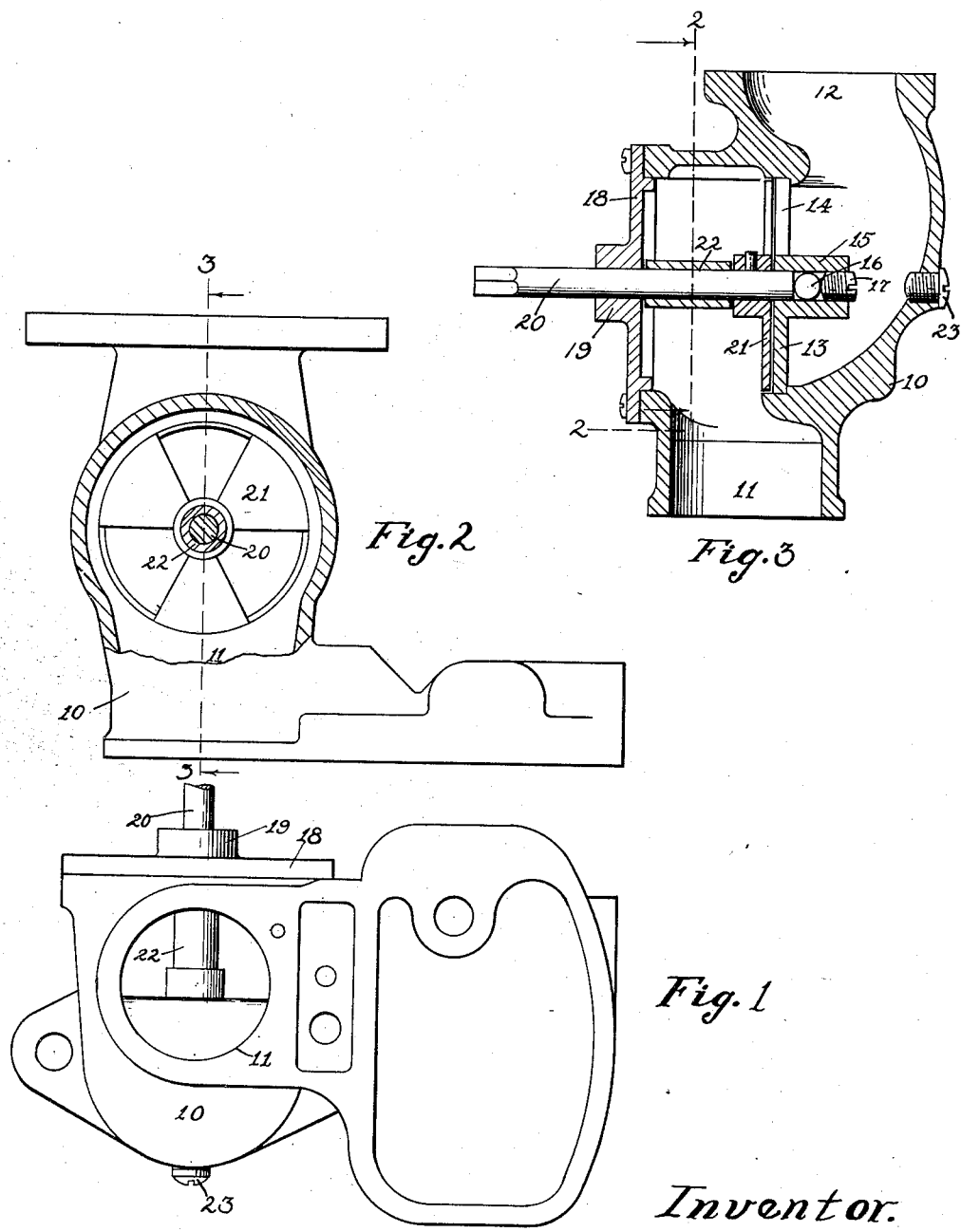
Figure 2 shows a vertical sectional view on the line 2—2 of Figure 3.
Figure 3 shows a sectional view on the line 3—3 of Figure 2.

My improved carburetor comprises a carburetor body or casing 10, having an inlet port 11 and a discharge port 12. Within the central portion of the body 10 is a stationary valve member 13 formed with three radial passageways 14. At the central portion of the stationary valve member is a tubular bearing 15, and in this bearing is a bearing ball 16 and an adjusting screw 17 to engage the ball.

At the side of the passageway through the body opposite the stationary valve member is a detachable closure plate 18 having a bearing member 19.

Mounted in the bearing members 19 and 15 is the valve shaft 20 having one end in engagement with the bearing ball 16. Fixed to the shaft 20 is a rotatable valve member 21 also having three radial passageways which will, in one position of the valve, register with the radial passageways of the stationary valve member, and when in another position the passageway through the valve is closed.

A sleeve 22 is mounted on the shaft 20 where it extends through the passageway through the valve.

A screw plug 23 is provided in the valve body in line with the ball adjusting screw 17 so that access may be had to the ball adjusting screw.

When the valve is being assembled the ball adjusting screw 17 is moved to position for placing the shaft 20 in such position that the rotary valve member 21 stands spaced apart from the stationary valve member 13 and the rotary valve member is not in engagement with any stationary part of the valve.

In practice I have demonstrated that with my improved valve and under actual working conditions where the pressure on the valve member 21 is extremely great, the valve member 21 and its shaft may be rotated for regulating the passageways through the valve with a minimum of friction, and because the shaft 20 has one bearing beyond the valve member which is attached to it and another at the opposite end of the shaft, all such pressures as would tend to tilt the shaft are thus overcome, and for that reason the two valve members may be adjusted to positions almost in engagement with each other and yet without any frictional contact; hence, the delicate governing mechanisms for automatically controlling the valve can be operated with great accuracy and very slight movement of the governing mechanisms will effect a corresponding slight adjustment of the valve, and this accurate response to the operation of the governing mechanisms will not in any way be affected by extreme pressures upon the rotatable valve member caused by air currents engaging it, because the shaft cannot tilt laterally and the rotary valve does not under any condition touch or rub against any part of the valve device. All of the pressure upon the rotary valve is in a direction toward the bearing ball 16 and, hence, with this bearing ball the friction on the shaft is minimized.

Under normal working conditions the passageways of the valve members 13 and 21 are seldom in direct alignment. In most instances portions of the valve 13 cover the radial openings of the valve 21. Hence, air currents through the valve strike the exposed portions of the valve 13, and some of this air passes through the space between the two valve members, and this tends to create counter currents and effect a more thorough mixture. Furthermore, because there are numerous passageways through the valve, the entire amount of air and vapor passing through the valve is thoroughly and uniformly mixed.

I claim as my invention:

A carburetor valve, comprising a valve casing formed with a valve stem bearing, a stationary valve member having radial disc-shaped valve passageways and being fixed in position within the valve casing, a tubular valve stem bearing integral with the said valve member and extended outwardly therefrom, a set screw and a bearing ball in said valve stem bearing, a rotary valve stem mounted in the bearing of the casing and having one end projected into the tubular valve stem bearing of the stationary valve member into engagement with said bearing ball, and a disc-shaped valve member having radial valve passageways fixed to the valve stem against movement longitudinally of the valve stem, and whereby adjustment of said set screw and bearing ball will hold the movable valve member in spaced apart position relative to the stationary valve member and prevent tilting movement of the movable valve member relative to the stationary valve member.

HERMAN W. BUBOLTZ.